No. 776,115. PATENTED NOV. 29, 1904.
E. COLQUHOUN.
BUSTLE.
APPLICATION FILED OCT. 10, 1904.
NO MODEL.
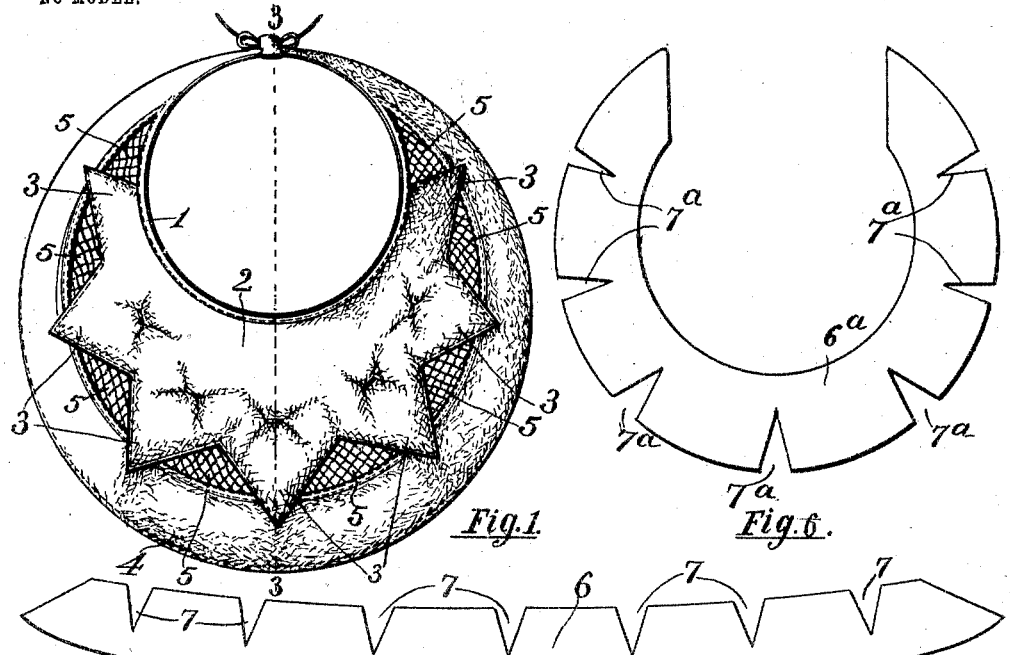
Fig.1. Fig.6.
Fig.4.
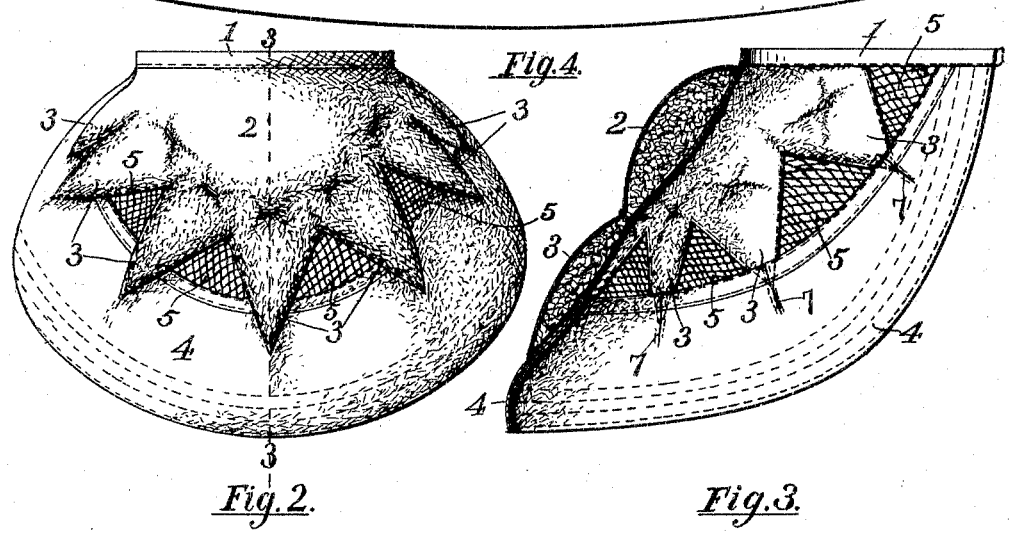
Fig.2. Fig.3.
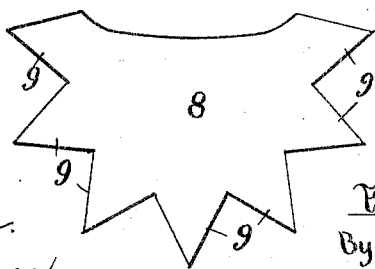
Fig.5.
Witnesses
Palmer A. Jones.
Georgiana Chace
Inventor
Edward Colquhoun
By Luther V. Moulton
Attorney No. 776,115.  
Patented November 29, 1904.

UNITED STATES PATENT OFFICE.

EDWARD COLQUHOUN, OF GRAND RAPIDS, MICHIGAN, ASSIGNOR OF ONE-HALF TO JOHN P. PLATTE, OF GRAND RAPIDS, MICHIGAN.

BUSTLE.

SPECIFICATION forming part of Letters Patent No. 776,115, dated November 29, 1904.

Application filed October 10, 1904. Serial No. 227,767. (No model.)

*To all whom it may concern:*

Be it known that I, EDWARD COLQUHOUN, a citizen of the United States, residing at Grand Rapids, in the county of Kent and State of Michigan, have invented certain new and useful Improvements in Bustles; and I do hereby declare the following to be a full, clear, and exact description of the invention, such as will enable others skilled in the art to which it appertains to make and use the same.

My invention relates to improvements in bustles; and its object is to provide the same with various new and useful features hereinafter more fully described, and particularly pointed out in the claims, reference being had to the accompanying drawings, in which—

Figure 1 represents a plan view of a device embodying my invention; Fig. 2, a rear elevation of the same; Fig. 3, a vertical section of the same on the line 3 3 of Figs. 1 and 2; Fig. 4, a diagram of a blank for the lower part of the bustle and shown on reduced scale; Fig. 5, the same of the upper part of the bustle, and Fig. 6 an alternative form of the blank shown in Fig. 4.

Like numerals refer to like parts in all of the figures.

1 represents the waistband of the bustle; 2, the main pad, forming the upper rear part of the same and directly connected to the rear of the waistband. From the lower part of this pad extends a series of radially and downwardly projecting portions 3, spaced apart to provide for ventilating-openings, each being curved to produce the desired rounded form.

4 represents the lower part of the bustle, extending circumferentially at the rear and thence forward and upward at each side and attached to the waistband, as in Fig. 3. This rear portion is properly rounded outward by means of darts formed by removing triangular portions of the fabric, as shown in Fig. 4 or Fig. 6. The radial extensions 3 are also preferably padded, as indicated in Fig. 3. The filling material consists of curled hair or other suitable light elastic material.

The lower ends of the extensions 3 are secured at intervals to the upper part of the lower portion 4, thus leaving triangular openings 5, which serve as ventilators, and which openings are preferably covered with suitable lace or other open material.

The device is thus easily constructed, the blanks for the same consisting of but four pieces, two such as shown in Fig. 4 or Fig. 6 and two such as shown in Fig. 5, the whole when finished forming a structure that is light, durable, well ventilated, and of symmetrical form. The lower part is preferably made of slightly-curved strips of fabric 6, having darts 7 in the upper edge, although it may be made of an annular piece $6^a$, having a portion removed at the front and provided with darts $7^a$ in the outer edge to contract the same. I prefer the form shown in Fig. 6 as being more economical of material and also having a continuous lower edge, and for that the darts can also be covered by the ends of the extension 3 of the upper part. It will also be noted that I provide ample ventilating-openings and at the same time provide for the proper rounded form of structure by means of the peculiar construction shown.

Having thus fully described my invention, what I claim, and desire to secure by Letters Patent, is—

1. In a bustle, a central upper portion, a series of downward and outward extensions to said portion and spaced apart from each other, and a lower continuous portion attached at intervals to the said extensions.

2. In a bustle, a central upper portion, radial triangular extensions to said portion and spaced apart from each other, and a lower continuous portion having a rounded outer surface and attached at intervals to the said extensions and leaving triangular openings therebetween.

3. In a bustle, a waistband, an upper central padded portion attached to the rear of the waistband, a series of outward and downward extensions on said portion and spaced apart, and a continuous rounded lower portion having its ends attached to the waistband at the respective sides of the middle portion and attached at intervals to said extensions.

4. In a bustle, a waistband, a central padded portion attached to the rear of the waistband, triangular padded radial extensions of said central portion and spaced apart at their outer angles, and a continuous rounded lower part having its ends attached to the waistband at the respective sides of the middle portion and attached at intervals to the said extensions and also having triangular spaces between the said extensions and lower part.

5. A bustle comprising a piece of fabric having a central portion adapted to be attached to a waistband and also having radial portions spaced apart, and a second piece of fabric curved laterally and having triangular portions removed from one edge to form darts therein, and attached to the first-named portion.

6. A bustle comprising a piece of fabric having a central portion adapted to be attached to a waistband and also having radiating triangular extensions, and a second piece of fabric having triangular portions removed to form darts corresponding in number to the outward extended angles of the first-named piece.

7. In a bustle, a central padded portion having triangular radiating and downwardly-curved extensions and a lower portion having a continuous lower edge and an outwardly-curved surface, said lower portion having darts formed by removing triangular portions of the fabric, and also being attached to the extensions with the darts beneath the same.

In testimony whereof I affix my signature in presence of two witnesses.

EDWARD COLQUHOUN.

Witnesses:
    LUTHER V. MOULTON,
    GEORGIANA CHACE.